(12) United States Patent
Roizin et al.

(10) Patent No.: US 8,501,573 B2
(45) Date of Patent: Aug. 6, 2013

(54) HIGH-RESOLUTION INTEGRATED X-RAY CMOS IMAGE SENSOR

(75) Inventors: Yakov Roizin, Afula (IL); Amos Fenigstein, Haifa (IL); Avi Strum, Migdal Haemek (IL); Alexey Heiman, Migdal Haemek (IL); Doron Pardess, Migdal Haemek (IL)

(73) Assignee: Tower Semiconductor Ltd., Migdal Haemek (IL)

( * ) Notice: Subject to any disclaimer, the term of this patent is extended or adjusted under 35 U.S.C. 154(b) by 145 days.

(21) Appl. No.: 12/390,169

(22) Filed: Feb. 20, 2009

(65) Prior Publication Data

US 2009/0181491 A1    Jul. 16, 2009

Related U.S. Application Data

(62) Division of application No. 11/563,129, filed on Nov. 24, 2006, now Pat. No. 7,608,837.

(51) Int. Cl.
*H01L 31/06* (2006.01)

(52) U.S. Cl.
USPC  438/378; 438/57; 257/E21.031; 257/E27.14; 257/430; 257/E27.146; 257/E31.086

(58) Field of Classification Search
USPC .................................................. 257/E21.031
See application file for complete search history.

(56) References Cited

U.S. PATENT DOCUMENTS

| | | | |
|---|---|---|---|
| 5,757,884 A | 5/1998 | Alexandrescu | |
| 5,981,959 A * | 11/1999 | Apte | 250/483.1 |
| 6,146,489 A | 11/2000 | Wirth | |
| 6,177,236 B1 | 1/2001 | Apte | |
| 6,429,437 B1 | 8/2002 | Laugier | |
| 6,744,052 B1 | 6/2004 | Petersson et al. | |
| 6,969,839 B2 * | 11/2005 | Costello | 250/214.1 |
| 7,656,001 B2 * | 2/2010 | Bui et al. | 257/461 |

(Continued)

FOREIGN PATENT DOCUMENTS

JP         358018834 A  *  2/1983

OTHER PUBLICATIONS

"Metallized and Oxidized Silicon Macropore Arrays Filled with a Scintillator for CCD-based X-ray Imaging Detectors" by X. Badel, et al., Oct. 29, 2003, 5 pages.

(Continued)

*Primary Examiner* — Julio J Maldonado
*Assistant Examiner* — Mohammad Choudhry
(74) *Attorney, Agent, or Firm* — Bever, Hoffman & Harms, LLP; E. Eric Hoffman

(57) ABSTRACT

An X-ray image sensor having scintillating material embedded into wave-guide structures fabricated in a CMOS image sensor (CIS). After the CIS has been fabricated, openings (deep pores) are formed in the back side of the CIS wafer. These openings terminate at a distance of about 1 to 5 microns below the upper silicon surface of the wafer. The depth of these openings can be controlled by stopping on a buried insulating layer, or by stopping on an epitaxial silicon layer having a distinctive doping concentration. The openings are aligned with corresponding photodiodes of the CIS. The openings may have a shape that narrows as approaching the photodiodes. A thin layer of a reflective material may be formed on the sidewalls of the openings, thereby improving the efficiency of the resulting waveguide structures. Scintillating material (e.g., CsI(Tl)) is introduced into the openings using a ForceFill™ technology or by mechanical pressing.

16 Claims, 20 Drawing Sheets

U.S. PATENT DOCUMENTS

2001/0028701 A1 10/2001 Schulz
2001/0054723 A1* 12/2001 Narui et al. .................. 257/228
2003/0022475 A1* 1/2003 Vieux-Rochaz et al. ..... 438/598
2004/0007722 A1 1/2004 Narui et al.
2004/0104351 A1* 6/2004 Shibayama ............. 250/370.11
2007/0072332 A1* 3/2007 Kemmer ........................ 438/56

OTHER PUBLICATIONS

CMOS X-rays detector array based on scintillating light guides by J.G. Rocha et al.; 2004; pp. 119-123.

* cited by examiner

HIGH-RESOLUTION INTEGRATED X-RAY CMOS IMAGE SENSOR

RELATED APPLICATIONS

This application is a divisional of U.S. patent application Ser. No. 11/563,129 entitled "High-Resolution Integrated X-Ray CMOS Image Sensor", filed Nov. 24, 2006.

FIELD OF THE INVENTION

The present invention relates to digital X-ray image sensors. More specifically, the present invention is related to a method and structure for integrating scintillating material and a waveguide structure on a semiconductor image sensor.

RELATED ART

Digital X-ray imaging devices are rapidly replacing photographic film-based X-ray imaging devices in medical applications (e.g., dental applications and mammography). In addition to the inherent advantages associated with digital imaging, digital X-ray imaging devices have the added benefit of being able to reduce the radiation dose received by the patient. Pulsed X-ray sources, along with X-ray dose adjustment for obtaining the required signal-to-noise ratio in the digital image, are employed to reduce the radiation dose.

Most digital X-ray imaging devices include an image sensor, which includes a scintillating plate mounted above a silicon-based charge coupled device (CCD) or diode array. The scintillating plate contains a scintillating material, which is required because devices that use silicon to directly generate photoelectrons in response X-rays have a low sensitivity, due to low X-ray absorption in silicon. The scintillating material has a higher absorption coefficient than silicon, and generates a large number of secondary optical photons in response to absorbing one X-ray photon. Cesium iodide doped with thallium CsI(Tl), which exhibits a narrow luminescent band centered at a wavelength of about 550 nanometers (nm), is a commonly used scintillating material.

The thickness of the scintillating material is usually about 50-200 microns (um). There is a trade off between the thickness of the scintillating material and the resolution of the resulting digital image. The secondary photons are emitted in an isotropic manner within the scintillating material, such that the lateral resolution of the resulting digital image becomes lower (poorer) as the scintillating material is made thicker. The lateral resolution is typically of the order of the scintillator film thickness.

A film of scintillating material (e.g., CsI), has been deposited over the entire active region of a detector panel, wherein a shadow mask prevents the scintillating material from being deposited on the inactive (peripheral) regions of the detector panel. This process is described in more detail in U.S. Pat. No. 6,146,489 by Wirth. The lateral resolution provided by the scintillating film is unacceptable for use with a standard CMOS image sensor, because of the relatively small pixel associated with CMOS image sensors.

To increase the lateral resolution, wave-guide structures have been created, thereby helping to concentrate secondary photons emitted within the scintillating material. A structure that includes both scintillating material and wave-guide structures is hereinafter referred to as a scintillating wave-guide structure.

One conventional scintillating wave-guide structure includes a plurality regularly spaced columns (i.e., needles) of CsI crystals formed on a graphite block. The CsI columns (needles) confine the generated secondary optical photons due to the total internal reflection at the interface between the CsI needles and the surrounding air. However, CsI is highly hygroscopic, thereby requiring that the CsI needles be capped by a passivation layer to avoid moisture absorption. Moreover, CsI needles in close proximity may experience random cross talk. Finally, this specialized scintillating structure is a discrete structure that must be fixed to a separate image sensor using mechanical means. A scintillating wave-guide structure that implements CsI needles is described in more detail in U.S. Pat. No. 6,429,437 by Laugier.

In a similar scintillating wave-guide structure, columns of scintillating material are separated by wave-guide structures made of aluminum (wherein the scintillating material is placed inside the aluminum deposited onto the front side of the wafer with preliminary formed photodiodes). Such a scintillating structure is described in more detail by Rocha et al., "Sensors and Actuators A", Vol. 110, pp. 119-123 (2004).

Yet another conventional scintillating wave-guide structure is formed by: etching openings in a silicon structure using electrochemical or deep reactive ion techniques, melting CsI (Tl), and then placing the melted CsI(Tl) into the etched openings in the silicon structure. Such a scintillating structure is described in more detail by Badel et al., "Metallized and Oxidized Silicon Macropore Arrays Filled With a Scintillator for CCD-based X-ray Imaging Detectors", Nuclear Science Symposium 2003, IEEE proceedings, ISBN: 0-7803-8258-7—IEEE Transactions on Nuclear Science vol. 51 (3) pp. 1001-1005 (2004).

Note that filling large cavities in a silicon structure with melted scintillating material is not compatible with CMOS back end processing, due to the high melting temperature of CsI (621° C.).

Undesirably, the above-described scintillating wave-guide structures of Laugier, Rocha et al. and Badel et al. are discrete structures that must be attached to a separate CCD or CMOS image sensor either directly or through a fiber optic connector. Attaching the scintillating wave-guide structure to the image sensor is a complex and costly operation. In addition, improper registration between the wave-guides and the associated pixels of the image sensor can result in reduced performance.

Furthermore, when using the above-described scintillating structures, a compromise has to be made between optimal wave guiding of optical photons and optimal X-ray absorption. This compromise is necessary because increasing the thickness of the scintillating material above ~100 microns usually does not increase the X-ray sensitivity when using the above-described scintillating wave-guide structures.

Scintillating material has also been integrated into micro-machined silicon cavities, wherein photodiodes (discrete N+-P diodes, not elements of a CMOS image sensor), are located within the micro-machined cavities (i.e., N+ doped walls of a trapezoidal cavity in P-type silicon). (Rocha, et al., "X-ray detector based on a bulk micromachined photodiode combined with a scintillating crystal", *Journal of Micromechanics and Microengineering* 13(4) S45-S50 (2003); (also Proc. MME'2002, (2002) pp. 323-326.)

However, the resulting image sensors have a low spatial resolution, on the order of hundreds of micrometers due to the specific shape of the micromachined cavities and low sensitivity of the employed photodiodes. A clamping pressure method is used to fill the openings in the silicon with CsI crystals, consisting of forcing the CsI into the openings in a vacuum at room temperature with a pressure of 10 MPa.

It would therefore be desirable to have a scintillating wave-guide structure that is integrated with a CMOS image sensor, thereby reducing the cost and increasing the reliability of the resulting digital X-ray sensor. It would further be desirable for such a scintillating wave-guide structure to facilitate the fabrication of a high resolution and high sensitivity digital X-ray sensor.

SUMMARY

Accordingly, the present invention provides an X-ray image sensor having scintillating material embedded into wave-guide structures fabricated in a CMOS image sensor (CIS). In a first embodiment, after the CIS has been fabricated, openings (deep pores) are formed in the back side of the CSI wafer. These deep pore openings terminate at a distance of about 1 to 5 microns below the upper silicon surface of the wafer. The depth of these deep pores can be controlled by stopping an etch on a buried insulating layer (in a silicon-on-insulator (SOI) structure), or by stopping an etch on an epitaxial silicon layer having a distinctive doping concentration. The deep pores are aligned with corresponding photodiodes of the CIS. In one embodiment, the deep pores have a shape that narrows as approaching the photodiodes.

In a second embodiment, openings in the form of stacked vias are formed in the multi-layer interconnect structure located the front side of a CIS wafer. These stacked via openings expose the CIS photodiodes fabricated on the front side of the wafer.

A thin layer of a reflective material (e.g., $SiO_2$ or a metal) may be formed on the sidewalls of the deep pore openings of the first embodiment or the stacked via openings of the second embodiment, thereby improving the efficiency of the resulting waveguide structures.

Scintillating material (e.g., CsI(Tl)) is introduced into the deep pore openings of the first embodiment or the stacked via openings of the second embodiment using a ForceFill™ technology or by mechanical pressing. These methods of placing the scintillating material in the openings can be performed at low temperatures and provide for complete filling of the openings.

The openings containing the scintillating material form wave-guide structures, which increase the resolution of an X-ray image created by the CIS. Main advantages of the present invention include low cost and high resolution.

The present invention will be more fully understood in view of the following description and drawings.

DETAILED DESCRIPTION

CMOS image sensors are well suited for use in large-area large-pixel applications, especially in the field of X-ray imaging. Traditional limitations of CMOS image sensors (compared with CCDs) include low fill-factor, low uniformity, poor noise and dark current performance, image lag and the necessity of micro-lenses. However, these factors are not critical in X-ray imager sensors. The traditional advantages of CMOS image sensors (compared with CCDs) include the ability to form large arrays and the ability to provide high sensitivity for a relatively low cost. (Large CMOS image sensor arrays are typically fabricated using stitching technology, wherein a die area greater than the field of exposure is exposed by breaking the stepper field size limitation and perfectly tiling intra-chip blocks.) The advantages associated with CMOS image sensors are important in the design of X-ray image sensors. Thus, CMOS image sensors are superior to other X-ray imaging solutions, such as CCD arrays and amorphous silicon (a-Si) photodiode arrays.

In accordance with one embodiment of the present invention, scintillating material is integrated into a standard CMOS image sensor, thereby creating an integrated X-ray imaging sensor. The present invention can be applied to either the back side or the front side of a CMOS image sensor. The back side embodiments are well suited for relatively large pixels (i.e., on the order of tens of microns), and can be used in large CMOS image sensors fabricated using a stitching technology. The front side embodiments are suited for relatively small pixels (i.e., on the order of 5-10 microns) and allow for resolution corresponding to the pixel size of a CMOS image sensor.

In accordance with one embodiment, openings are formed in the back side or front side of the CMOS image sensor, wherein the openings correspond with pixels of the CMOS image sensor. A scintillating material, such as CsI(Tl), is evaporated or sputtered over the openings to a thickness of the order of the opening depth (typically 4-6 microns from the front side or hundreds of microns from the back side). A ForceFill™ procedure or mechanical pressing is then performed to force the scintillating material into the openings. A ForceFill™ procedure can be performed, for example, by a Trikon Sigma® fxP™ machine. The various embodiments of the present invention are described in more detail below.

Figure 1:
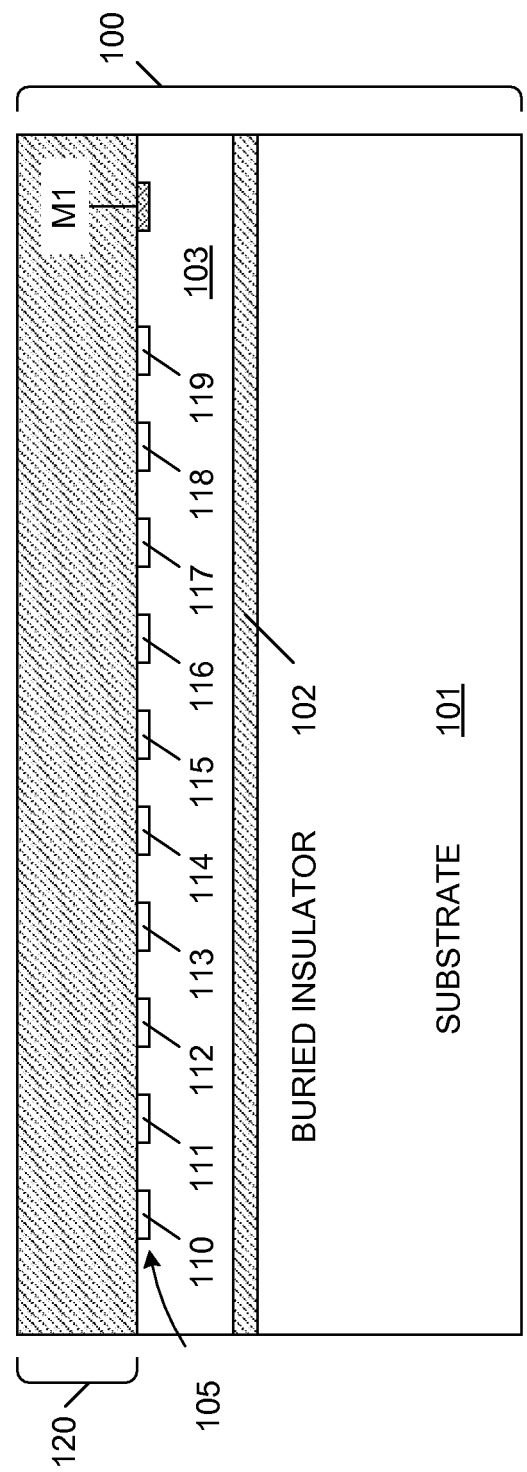
FIG. 1 is a cross sectional view of a conventional CMOS image sensor, which is fabricated using a silicon on insulator (SOI) structure.

FIG. 1 is a cross sectional view of a conventional CMOS image sensor (CIS) 100, which is fabricated using a silicon on insulator (SOI) structure. CIS 100 includes semiconductor substrate 101, buried insulator layer 102, active silicon island layer 103, photodiode regions 110-119, alignment marker M1 and multi-layer interconnect structure 120. In the described embodiments, substrate 101 and silicon layer 103 are monocrystalline silicon, and buried insulator layer 102 is silicon oxide. Each of photodiodes 110-119 forms a part of a corresponding CMOS pixel. Although only ten photodiodes 110-119 are illustrated, it understood that a much larger array of photodiodes are fabricated on the upper surface of silicon layer 103. Alignment marker M1 (along with other alignment markers that are not shown) is used to align the various masks used to fabricate CIS 100. Interconnect structure 120 includes the various dielectric and conductive (metal) layers used to connect the various circuit elements of CIS 100. As described in more detail below, CIS 100 is modified in various manners to implement integrated X-ray image sensors in accordance with the present invention.

FIGS. 2-10 are cross sectional views that illustrate process steps for converting CMOS image sensor 100 to an X-ray image sensor in accordance with one embodiment of the present invention.

Figure 2:
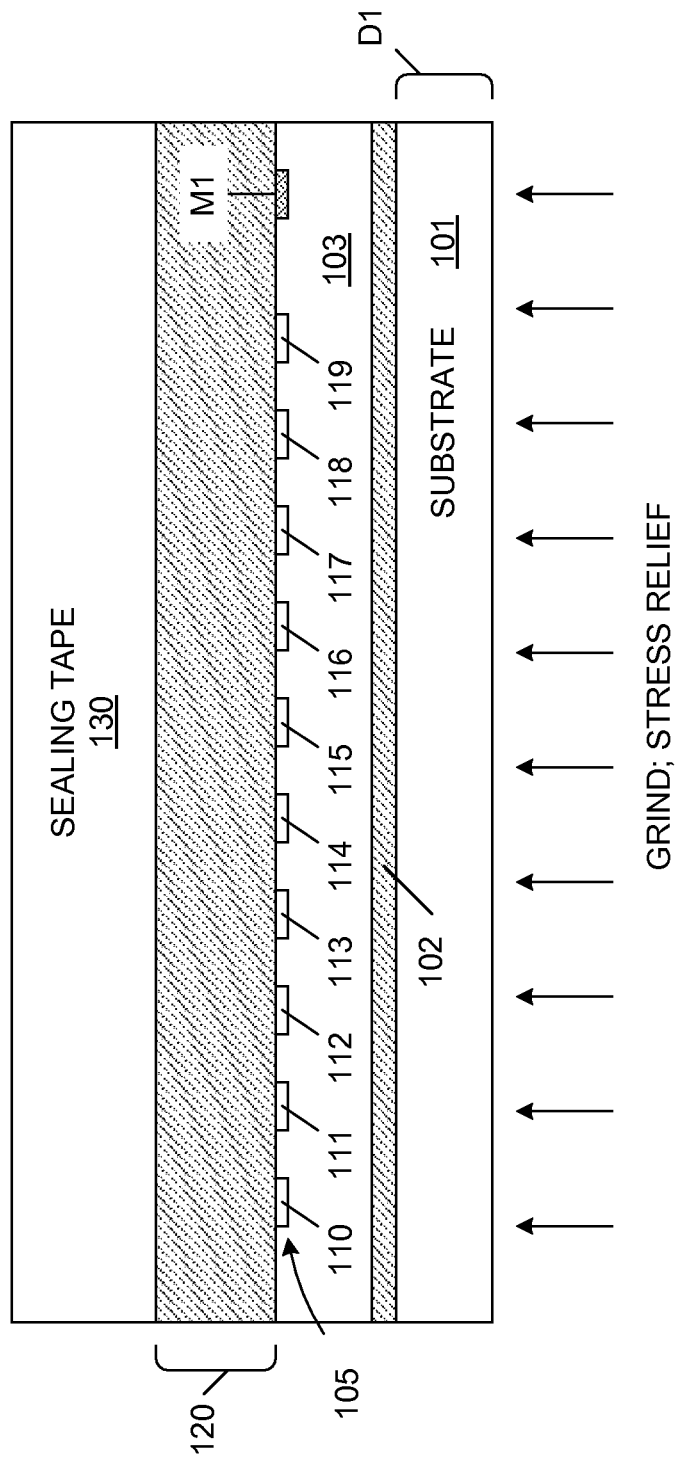
FIGS. 2-10 are cross sectional views that illustrate process steps for converting the CMOS image sensor of FIG. 1 to an X-ray image sensor in accordance with one embodiment of the present invention.
Figure 3:
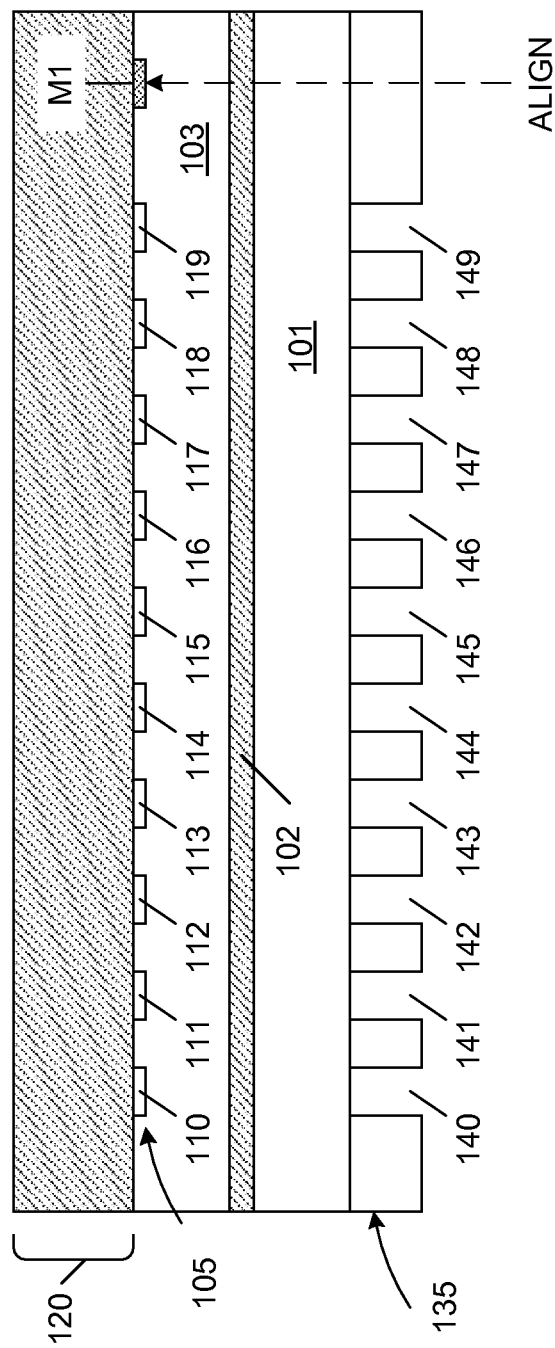

As illustrated in FIG. 2, sealing tape 130 is applied to the upper surface of multi-layer interconnect structure 120, thereby allowing CMOS image sensor 100 to be held during a subsequent grinding step. The back side of the silicon wafer (i.e., the bottom surface of substrate 101) is subjected to grinding until the substrate 101 has a resulting thickness D1 of about 50 to 250 microns. This thickness D1 is selected in view of the trade-off between X-ray absorption in the scintillating material subsequently deposited into openings in substrate 101 (which increases as the thickness D1 increases), and the propagation of visible light in the waveguides formed in substrate 101 (which decreases as the thickness D1 increases). In a particular embodiment, the thickness D1 is controlled to be about 80 microns.

After the grinding step is completed, the wafer is introduced to a 6:1:1 mixture of $HNO_3$:HF:acetic acid, thereby providing stress relief for the resulting structure. Sealing tape 130 is then removed, and the wafer is cleaned.

A layer of photoresist is then formed over the backside of the wafer (i.e., the new bottom surface of the grinded substrate 101). This photoresist layer is exposed through a reticle and then developed, thereby creating the photoresist mask 135 illustrated in FIG. 3. The reticle is aligned with the front side of the wafer using marker M1 (in combination with other markers on the front side of the wafer). Infra-red (IR) radiation passes through silicon and dielectric layer 102, thereby enabling this alignment through the back side of the wafer. Photoresist mask 135 includes a plurality of openings 140-149, each aligned with a corresponding one of the photodiodes 110-109.

Figure 4:
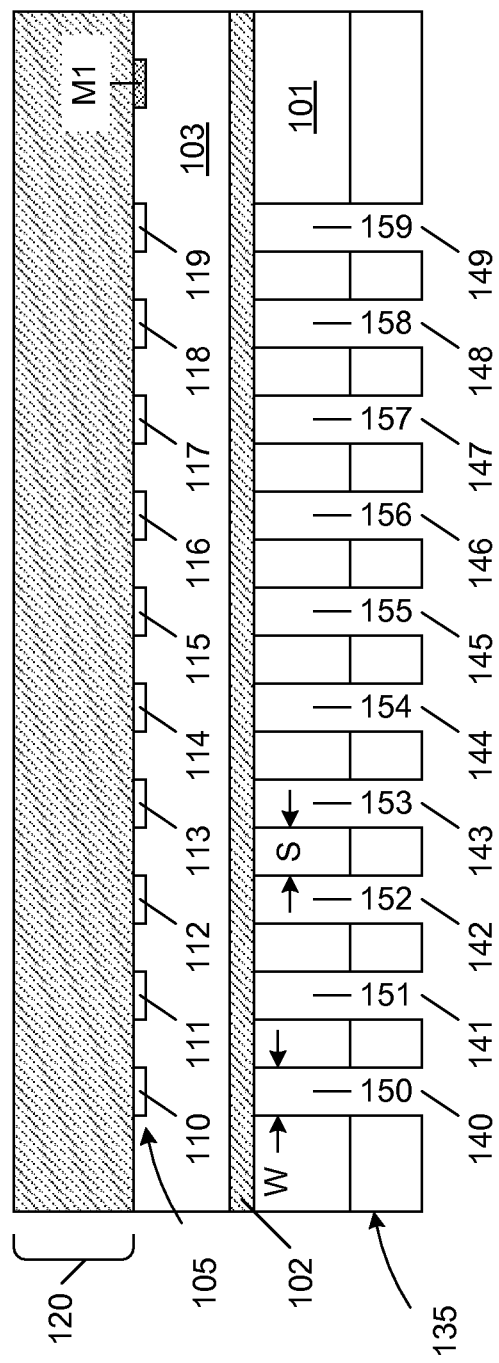

As illustrated in FIG. 4, a deep reactive ion etch (RIE) is performed through the openings 140-149 of photoresist mask 135, thereby forming waveguide openings 150-159 in silicon layer 101. This etch is stopped on buried dielectric layer 102. The waveguide openings 150-159 are aligned with photodiodes 110-119, respectively. Waveguide openings 150-159 may exhibit a width W in the range about 10 to 150 microns. This width W is therefore consistent with the widths of photodiodes 110-119, which typically exhibit a width in the range of about 10 to 150 microns. Although not specifically illustrated in FIG. 4 (for purposes of clarity), the spacing S between waveguide openings 150-159 is much less than the width W, such that a high X-ray radiation fill factor is achieved. In one embodiment, the width W is at least about 10 times greater than the spacing S.

Figure 5:
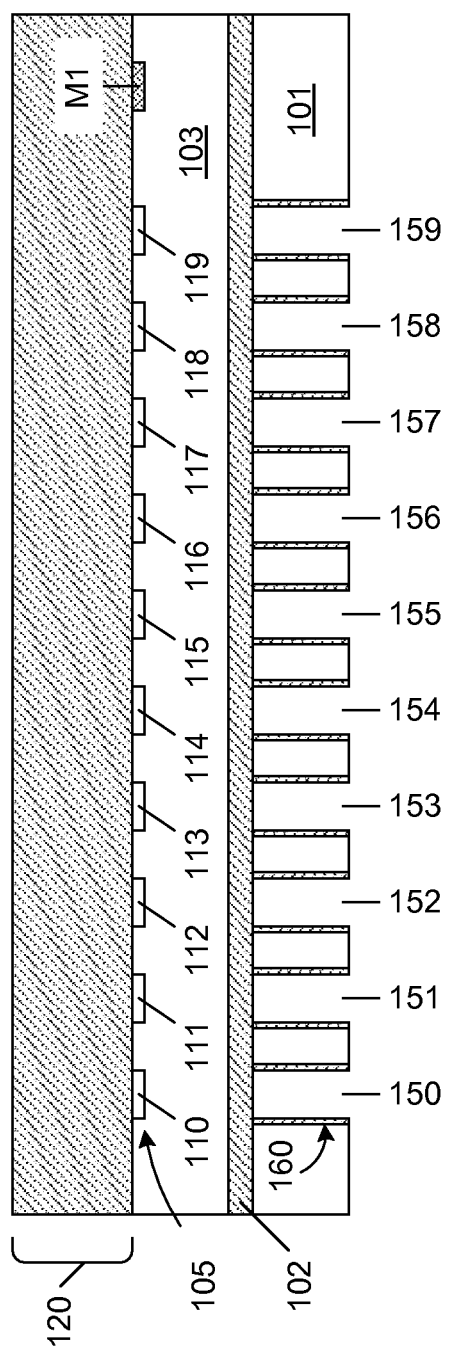

As illustrated in FIG. 5, photoresist mask 135 is stripped, and a layer of reflective material 160 is formed over the sidewalls of openings 150-159. In one embodiment, reflective material 160 is silicon oxide ($SiO_2$) having a thickness of about 0.05 to 0.2 microns. The silicon oxide forms the walls of an optical waveguide, which operates on the total reflection principle with respect to subsequently deposited CsI scintillating material. The total reflection critical angle θ at the silicon oxide/CsI interface is about 56° (sin θ=$n_1/n_2$ wherein $n_1$=1.46 ($SiO_2$) and $n_2$=1.76 (CsI)). Thus, visible light (photons) approaching a silicon oxide/CsI interface at an angle greater than 56° (measured from a line perpendicular to the silicon oxide/CsI interface) will be reflected at the interface. Conversely, visible light (photons) approaching a silicon oxide/CsI interface at an angle less than 56° (measured from a line perpendicular to the silicon oxide/CsI interface) will be transmitted through the interface. Note that the total reflection principle applies at the interfaces between scintillating plugs 180-189 and silicon oxide sidewalls 160, as well as the interfaces between scintillating plugs 180-189 and buried dielectric layer 102. Photons traveling at an angle less than the total reflection critical angle of about 56° (measured from the perpendicular to the buried layer 102) pass through the buried layer 102, but photons approaching buried layer 102 at a glancing angle are reflected. Note that some of the visible light that passes through the interfaces between scintillating plugs 180-189 and the silicon oxide sidewalls 160 is lost (i.e., is absorbed in the silicon located between openings 150-159)).

In alternate embodiments reflective material 160 can be a metal (e.g., aluminum or titanium nitride) formed by sputtering/deposition. In these embodiments, an RIE step must be performed to remove any metal located at the bottom of openings 150-159 (i.e., located on buried insulating layer 102).

Figure 6:
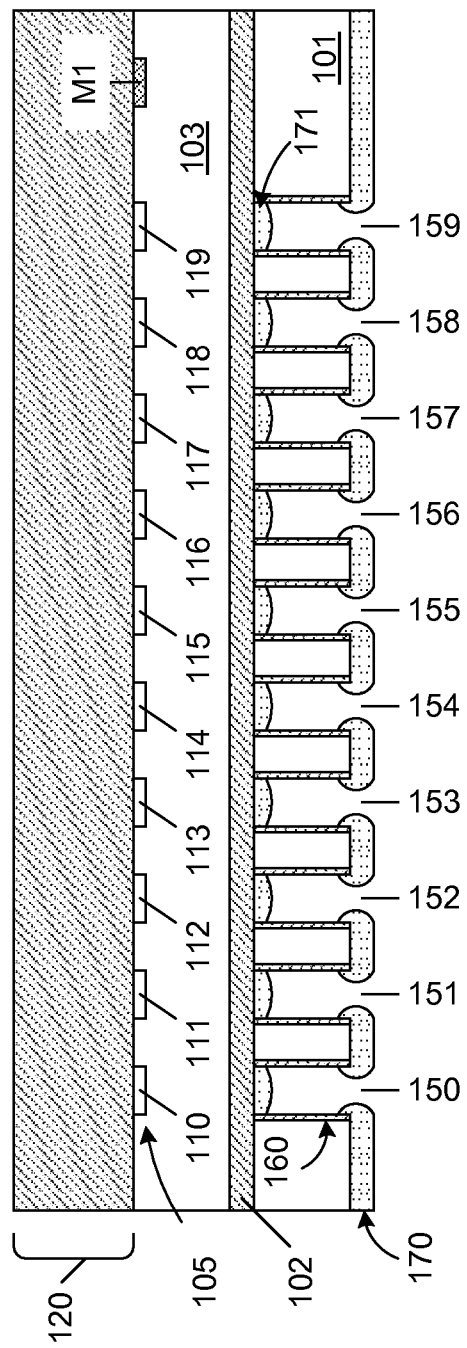
Figure 7:
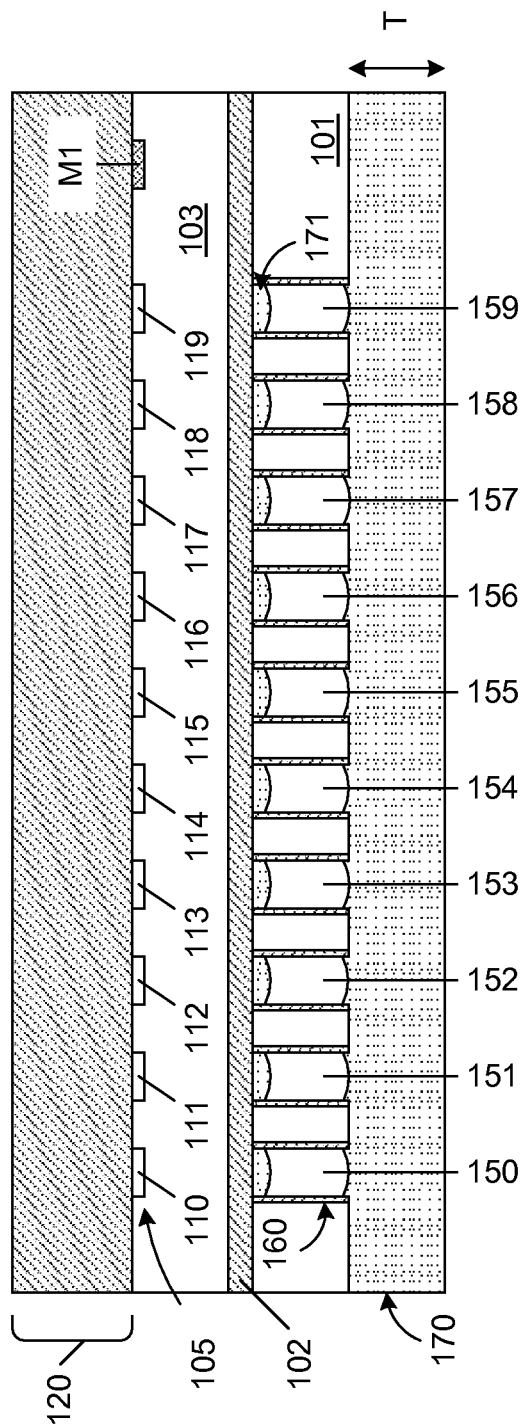

As illustrated in FIGS. 6-7, a scintillating material is introduced to the backside of silicon layer 101 by evaporation, sputtering or another method. In one embodiment, the scintillating material is CsI(Tl). In another embodiment, the scintillating material includes nanocrystals of silicon with sizes of 20 to 30 Angstroms. In this embodiment, the voids between the silicon nanocrystals serve as a scintillator. Such silicon nanocrystals can be introduced by depositing a CVD oxide with an excess of silicon. In another embodiment, the scintillating material may be porous silicon. In any of these embodiments, the scintillating material is introduced or formed at a relatively low temperature (e.g., 250 to 450° C.). As a result, the introduction of the scintillating material does not adversely affect the previously fabricated circuitry of CMOS image sensor 100.

A shown in FIG. 6, a thin scintillating layer 170 is initially deposited on the exposed surface of silicon layer 101, and a thin scintillating layer 171 is formed at the bottoms of openings 150-159. As shown in FIG. 7, scintillating material continues to be deposited until scintillating layer 170 becomes a continuous layer on the lower surface of silicon layer 101. Note that bridging occurs to enable scintillating layer 170 to become a continuous layer 170. The thickness T of continuous scintillating layer 170 is selected to be greater than the width W of openings 150-159.

Figure 8:
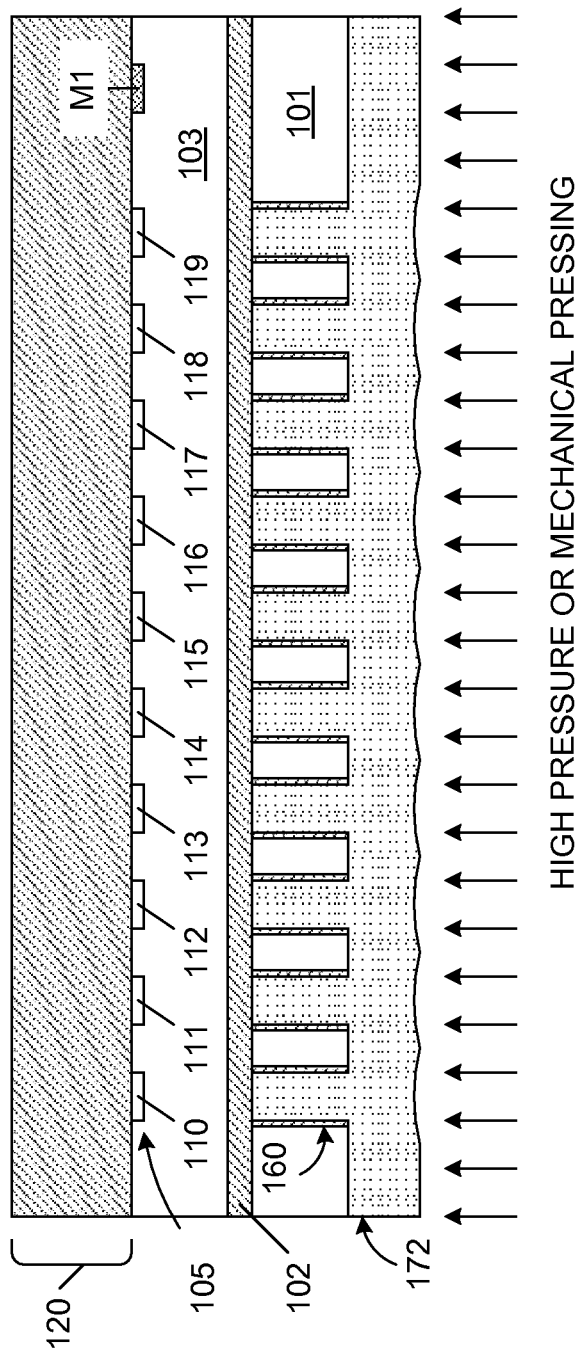

As illustrated in FIG. 8, the resulting structure is then exposed to a high pressure on the order of about 5 to 50 MPa, thereby forcing portions of the continuous scintillating layer 170 into openings 150-159, and forming a continuous scintillating layer 172. Note that the thickness T of continuous scintillating layer 170 is selected to ensure that there is sufficient scintillating material to completely fill openings 150-159.

In an alternate embodiment, mechanical pressing may be used to force portions of the continuous scintillating layer 170 into openings 150-159.

If openings 150-159 have been filled with CsI(Tl), a bake operation is performed at a temperature in the range of about 350-500° C. in order to improve the transmission of visible light in this scintillating material.

Figure 9:
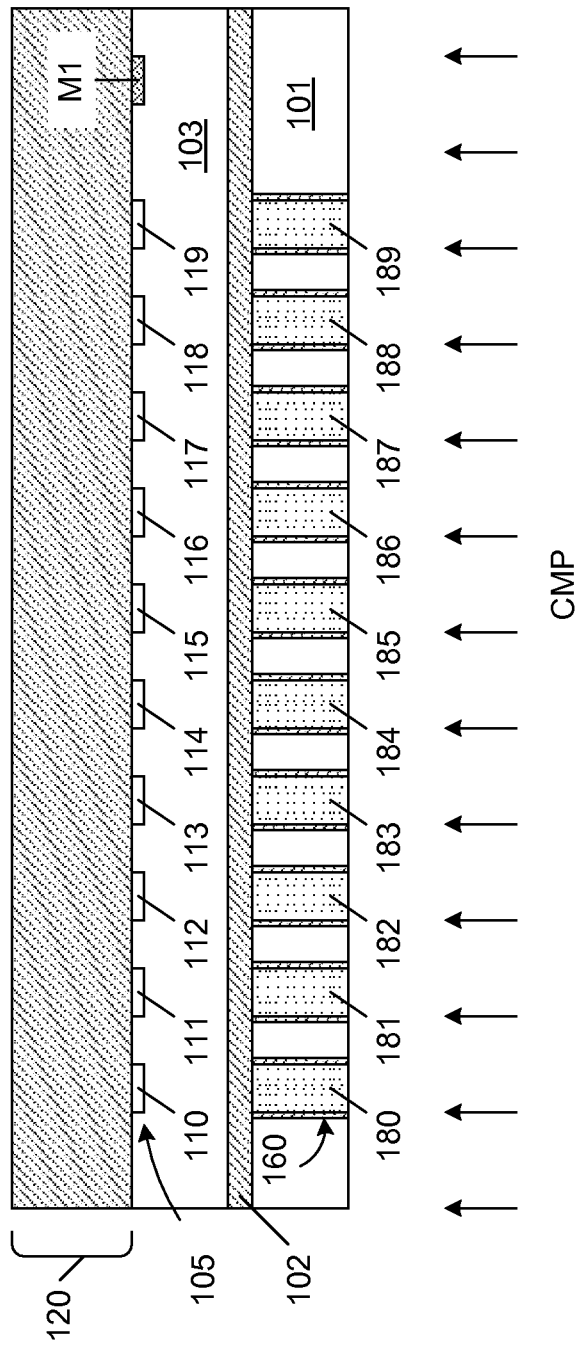

As illustrated in FIG. 9, the back side of the wafer is then subject to chemical mechanical polishing (CMP), thereby forming scintillating plugs 180-189, removing material residues, and planarizing the backside surface.

Figure 10:
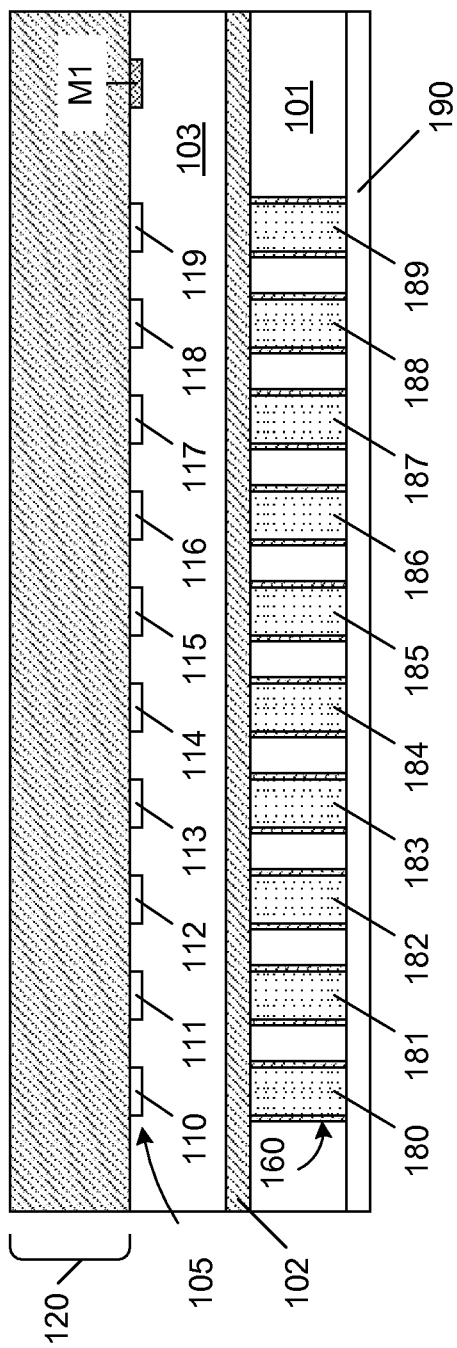

As illustrated in FIG. 10 a layer 190 of reflecting material (such as aluminum, another reflecting metal, or a polymer) is deposited on the back side surface. Reflecting layer 190 reflects visible light, but is transparent to X-rays. Thus, reflecting layer 190 allows X-rays to reach the scintillating plugs 180-189, but prevents the resulting visible light (photons) from escaping. Thus, a high percentage of the secondary optical photons generated within the scintillating plugs 180-189 are advantageously directed toward photodiodes 110-119.

In the foregoing manner, an X-ray image sensor is created by integrating a scintillating material and wave-guides into a conventional CMOS image sensor.

Figure 11:
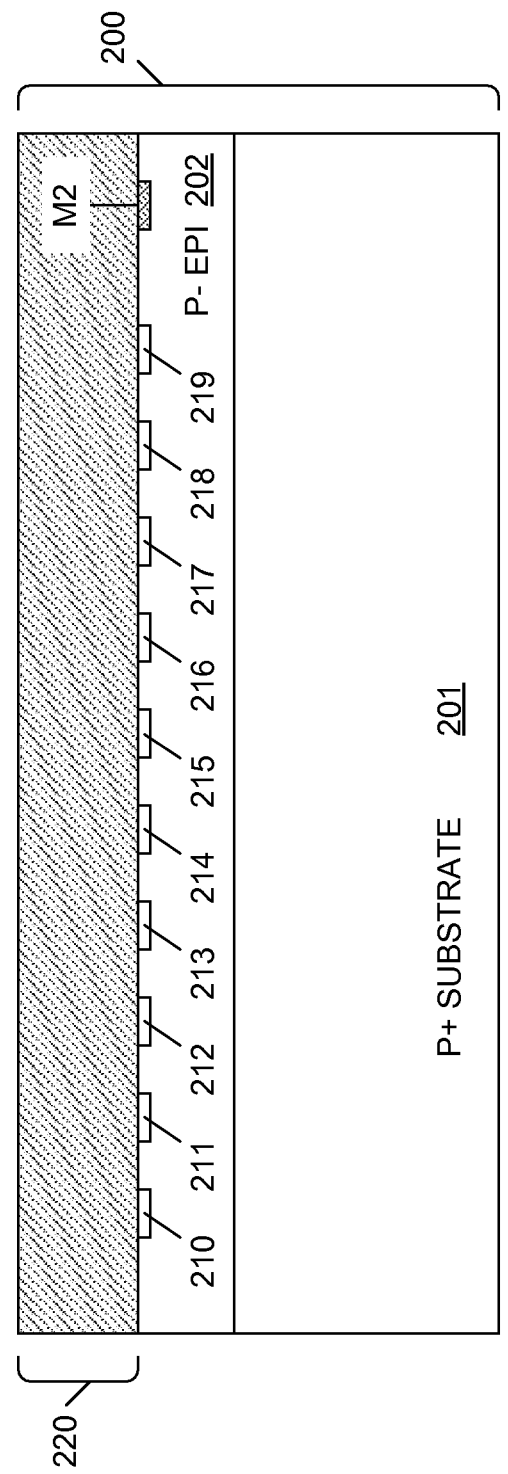
FIG. 11 is a cross sectional view of a conventional CMOS image sensor, which is fabricated on an epitaxial silicon layer.

In an alternative to the above described embodiments, the SOI-based CMOS image structure 100 can be replaced with a CMOS image sensor fabricated on a conventional epitaxial silicon layer. FIG. 11 is a cross sectional view of a conventional CMOS image sensor 200, which includes a P+ silicon substrate 201, a P– epitaxial silicon layer 202, alignment marker M2, photodiodes 210-219, and interconnect structure 220. In the described embodiments, P– epitaxial layer 202 has approximately the same thickness as silicon island layer 103. In accordance with one embodiment, this thickness is on the order of 1 to 5 microns.

Figure 12:
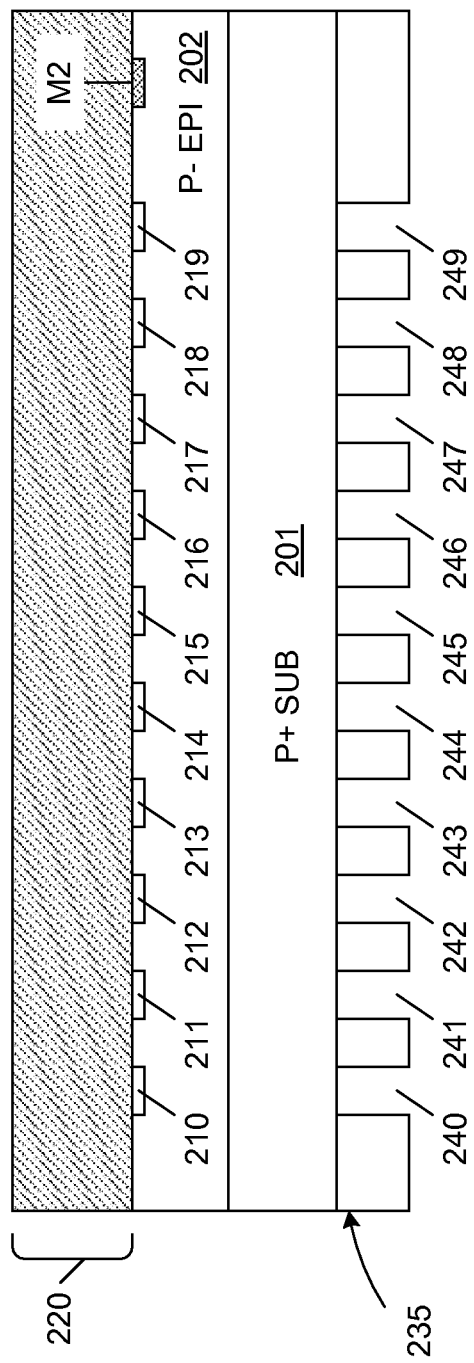
FIGS. 12-15 are cross sectional views that illustrate process steps for converting the CMOS image sensor of FIG. 11 to an X-ray image sensor in accordance with one embodiment of the present invention.

FIGS. 12-15 are cross sectional views that illustrate process steps for converting CMOS image sensor 200 to an X-ray image sensor in accordance with one embodiment of the present invention. CMOS image sensor 200 is initially subjected to the back side grinding and stress relief steps described above in connection with FIG. 2. As illustrated in FIG. 12, a photoresist mask 235, which is similar to above-described photoresist mask 135 (FIG. 3), is formed over the bottom surface of P+ substrate 201. Photoresist mask 135 includes openings 240-249, which are aligned with photodiodes 210-219, respectively.

Figure 13:
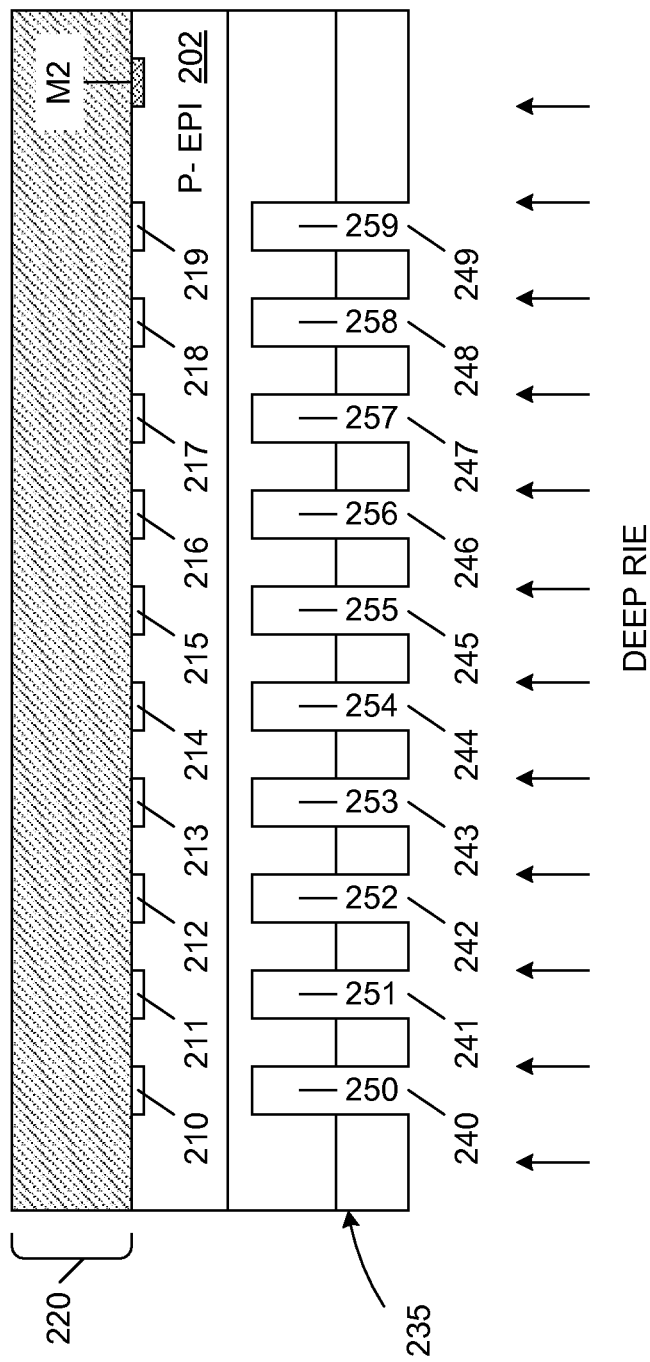

As illustrated in FIG. 13, a deep reactive ion etch is performed through photoresist mask 235, thereby starting openings 250-259. This etch is stopped prior to reaching P– epitaxial layer 202. The deep reactive ion etch allows relatively deep openings to be formed in a relatively short time period.

Figure 14:
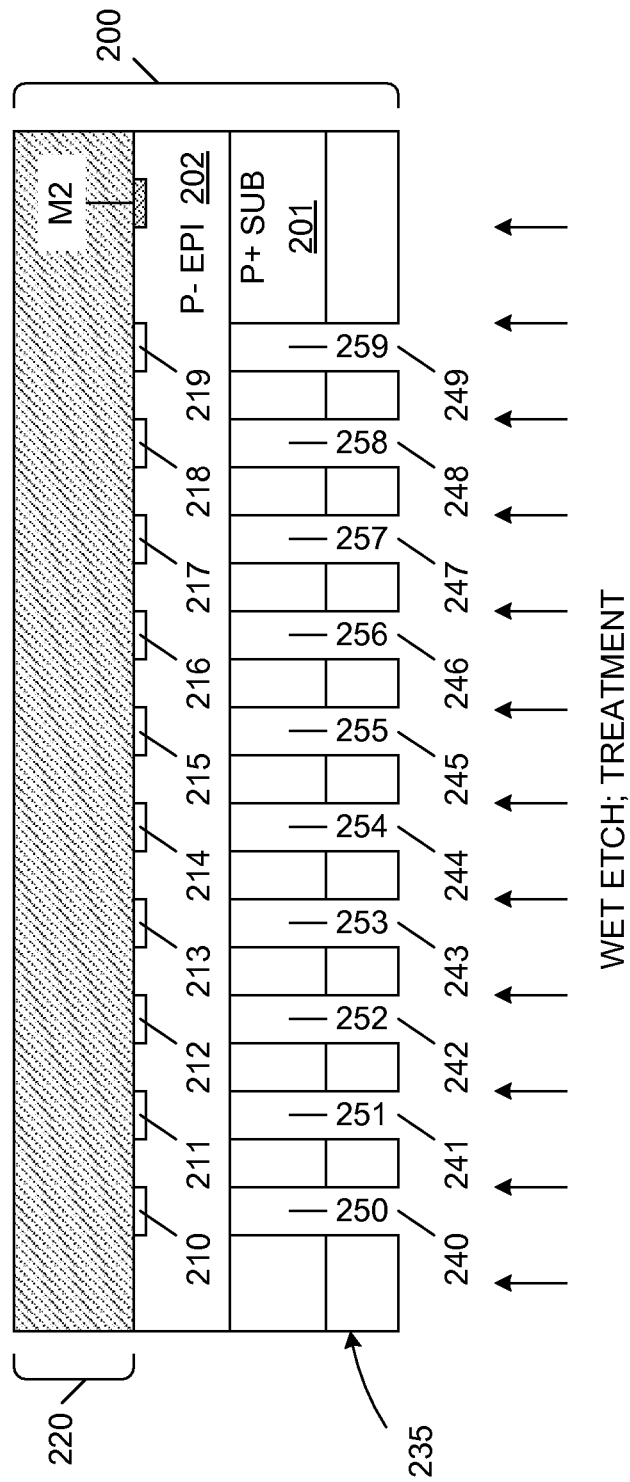

As illustrated in FIG. 14, the formation of openings 250-259 is completed by a wet etch, which is performed through photoresist mask 235. The wet etch is selected in a manner well known to those of ordinary skill in the art to provide a high etch selectivity between P+ and P– silicon. The wet etch is easily controlled to stop on P– epitaxial layer 202.

The portions of P– epitaxial layer exposed by the wet etching may be damaged by the etch. After the wet etch step is complete, the portions of P– epitaxial layer 202 exposed through openings 250-259 are treated in order to prevent the subsequent recombination of photo-generated electrons and holes within the damaged post-etch silicon. In one embodiment, this treatment includes performing low temperature thermal oxidation. In another embodiment, this treatment can include performing an N+ implant into these silicon regions, thereby creating an energetic potential barrier to the electrons to prevent these electrons from escaping from the photodiode junction. In yet another embodiment, the treatment may include electrochemical anodic oxidation of the damaged silicon regions, thereby creating a chemical $SiO_2$ layer.

Figure 15:
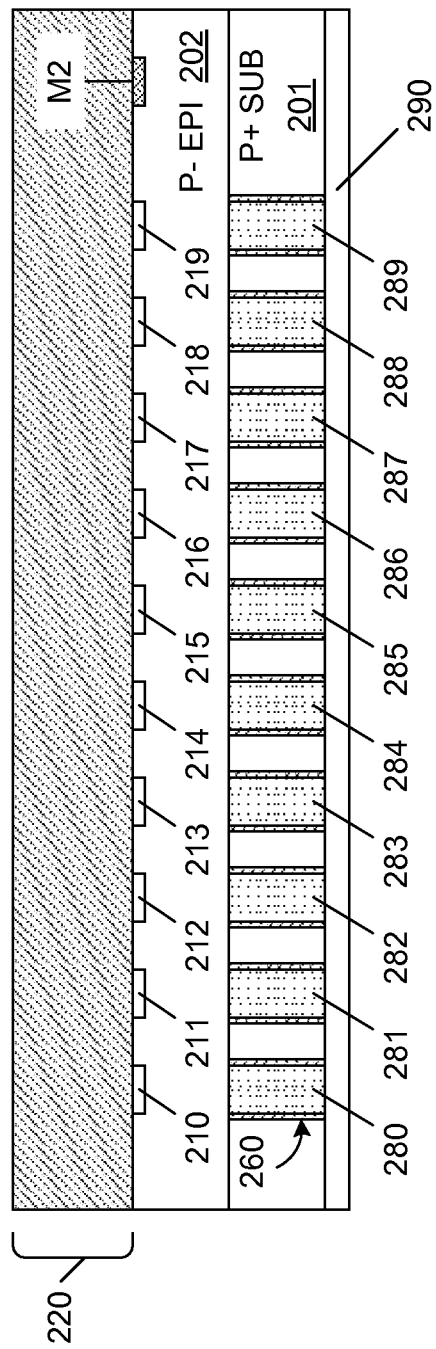

After openings 250-259 have been treated, processing proceeds in the same manner described above in connection with FIGS. 5-10, thereby creating the X-ray image sensor illustrated in FIG. 15. The X-ray image sensor of FIG. 15 includes reflective layer 260, scintillating plugs 280-289, and reflective layer 290 (which are similar to reflective layer 160, scintillating plugs 180-189 and reflective layer 190, respectively).

In accordance with another embodiment of the present invention, openings can be formed on the top side (back end) of CMOS image sensor 100 (or 200) by etching through multi-layer interconnect structure 120 (or 220). These openings can be formed through the passivation layer and the back-end dielectric layers of the interconnect structure as described in commonly owned, co-pending U.S. patent application Ser. No. 11/361,450 by Reznik et al., which is hereby incorporated by reference in its entirety. Each of these openings expose a corresponding photodiode formed on the upper surface of the substrate. A layer of silicon oxide ($SiO_2$) is deposited on the sidewalls of the etched openings, thereby preventing the possible exposure of metal lines in the interconnect structure to the subsequently deposited scintillating material. After the silicon oxide has been deposited, the openings are filled with a scintillating material or silicon nanocrystals in the manner described above.

As described in U.S. patent application Ser. No. 11/361,450 by Reznik et al., the openings formed in the multi-layer interconnect structure have a stacked via configuration. Moreover, these openings may have cone-shaped cross section that narrows as approaching the photodiodes, thereby concentrating the X-ray generated photons and increasing the fill factor. Note that the openings 150-159 (FIG. 4) and 250-259 (FIG. 14) can also have cone-shaped cross sections in alternate embodiments.

Figure 16:
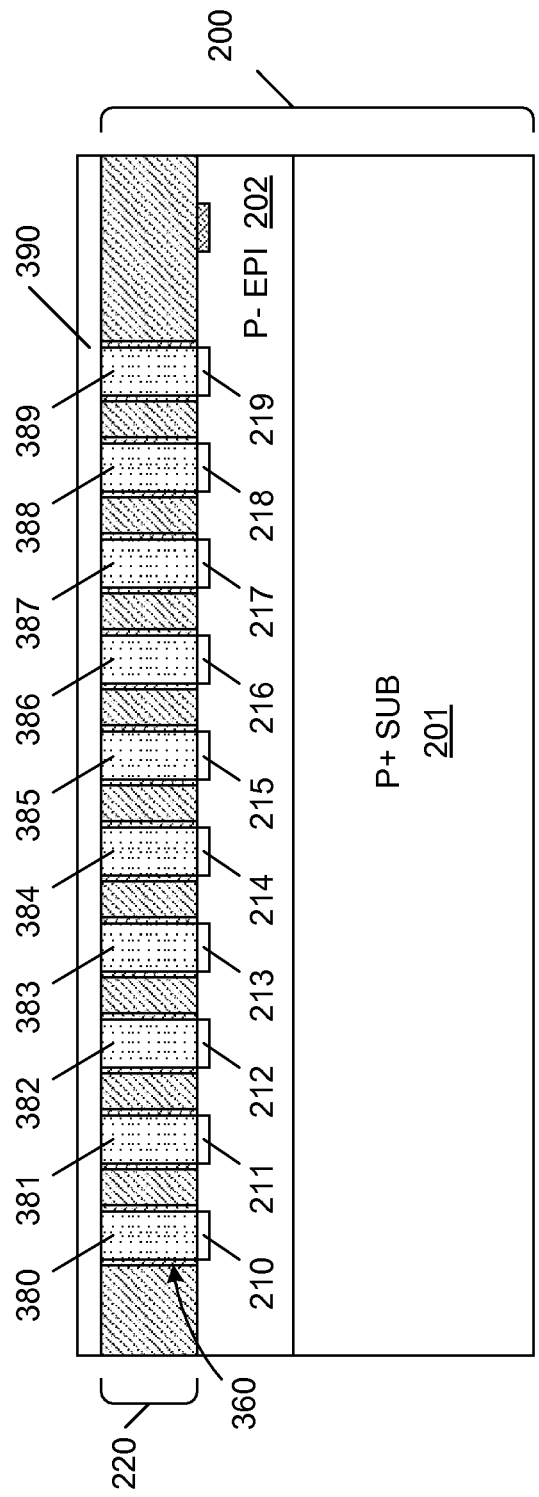
FIG. 16 is a cross sectional view of an X-ray image sensor created by forming scintillating plugs through a multi-layer interconnect structure on the front side of the CMOS image sensor of FIG. 2, in accordance with another embodiment of the present invention.

FIG. 16 is a cross sectional view of an X-ray image sensor created by forming scintillating plugs 380-389 through the multi-layer interconnect structure 220 of CMOS image sensor 200. Silicon oxide sidewall material 360 functions as a wave-guide wall structure, and prevents the scintillating material from contacting metal present in the multi-layer interconnect structure 220. Reflecting layer 390 is formed over the front side of CMOS image sensor 200.

At present, the price of X-ray imaging devices is high (e.g., from $1,000 to $12,000). High production costs are, in particular, connected with expensive operation or scintillator plate alignment and optical connection. An X-ray imaging device in accordance with the present invention can be made for a much lower cost than the present X-ray imaging devices, due to savings associated with integration.

When using CMOS image sensor 100 or 200 for X-ray registration, the issue of X-ray degradation must be considered. The most sensitive parameter associated with X-ray degradation is the dark current. Digital CMOS image sensors are typically quoted radiation hard to about 100 krad. The lifetime of the imaging device depends on the X-ray parameters, with the lifetime decreasing with the increase of the quanta energy for the same dose rate. In the range of X-ray quanta energy (i.e., 10 keV-100 keV) noticeable changes in the dark current occur at approximately 10 krad. The starting dark current is very low and thus the CMOS image sensor is functional significantly above this limit. With typical absorbed doses of 10 mrad in one dental X-ray imaging procedure, degradation is expected after 1M procedures. Thus, CMOS degradation is not a concern even if the same radiation doses used in conventional silver-halide radiography are used in connection with the present invention.

In the above-described back side embodiments, the thickness of the scintillator material 180-189 is the same as in most X-ray digital imaging devices. The thickness of silicon layer 103 (or P– epi layer 202) is about 1 to 5 microns. The expected visible light intensity loss is determined mainly by reflection at the interface of the scintillating material and the silicon layer because the ambipolar diffusion length in the employed Si is higher than 1 to 5 microns.

An estimation of the number of optical photons reaching photodiode 110 will now be provided. Assume that CsI(Tl) plug 180 is a 6×6×6 micron cube covered by a reflecting metal on all sides except the 6×6 side facing photodiode 110. Further assume that the scintillating material contains approximately 0.02 percent Tl. The volume of scintillating material in plug 180 is $2\times10^{-10}$ cm$^3$ and the weight of this scintillating material is about $10^{-9}$ grams.

The X-ray conversion coefficient k of the scintillating material is about 70,000 visible photons for each 1 MeV of absorbed energy. The number of optical photons reaching the photodiode 110 is defined by the following equation:

$$N = mkE,$$

wherein E is the energy absorbed by the scintillating material, and m characterizes the optical cavity and is approximately 70% for the considered geometry. For a typical 10 mrad absorption dose, $E = 100 \times 10^{-2}$ erg/g $\times 10^{-9}$ g $\times 6.2 \times 10^{11}$ eV/erg = ~600 eV.

As a result, approximately 30 optical photons (i.e., 600 eV × 70% × 70,000 photons/1 MeV × 1 MeV/$10^6$ eV = ~30 photons of 1.4 eV) will reach photodiode 110 during a single exposure. A typical 6×6 micron pixel has noise of less than 0.5 electrons. A signal-to-noise ratio (SNR) of about 50 is considered suitable for dental applications. In case of 6×6 micron photodiodes, a 2×2 cm matrix will contain approximately 8 Mpixels, which will provide much more resolution than typically required for dental applications.

Note that the above-described integrated X-ray image sensors do not require a separate scintillator plate. However, in another embodiment of the present invention, a bonding technique is used to attach a separate scintillator plate (formed in accordance with the present invention) to a conventional CMOS image sensor.

As illustrated in FIGS. 17-20, a double bonding technique is used to locate scintillating material on the back side of conventional CMOS image sensor 200.

Figure 17:
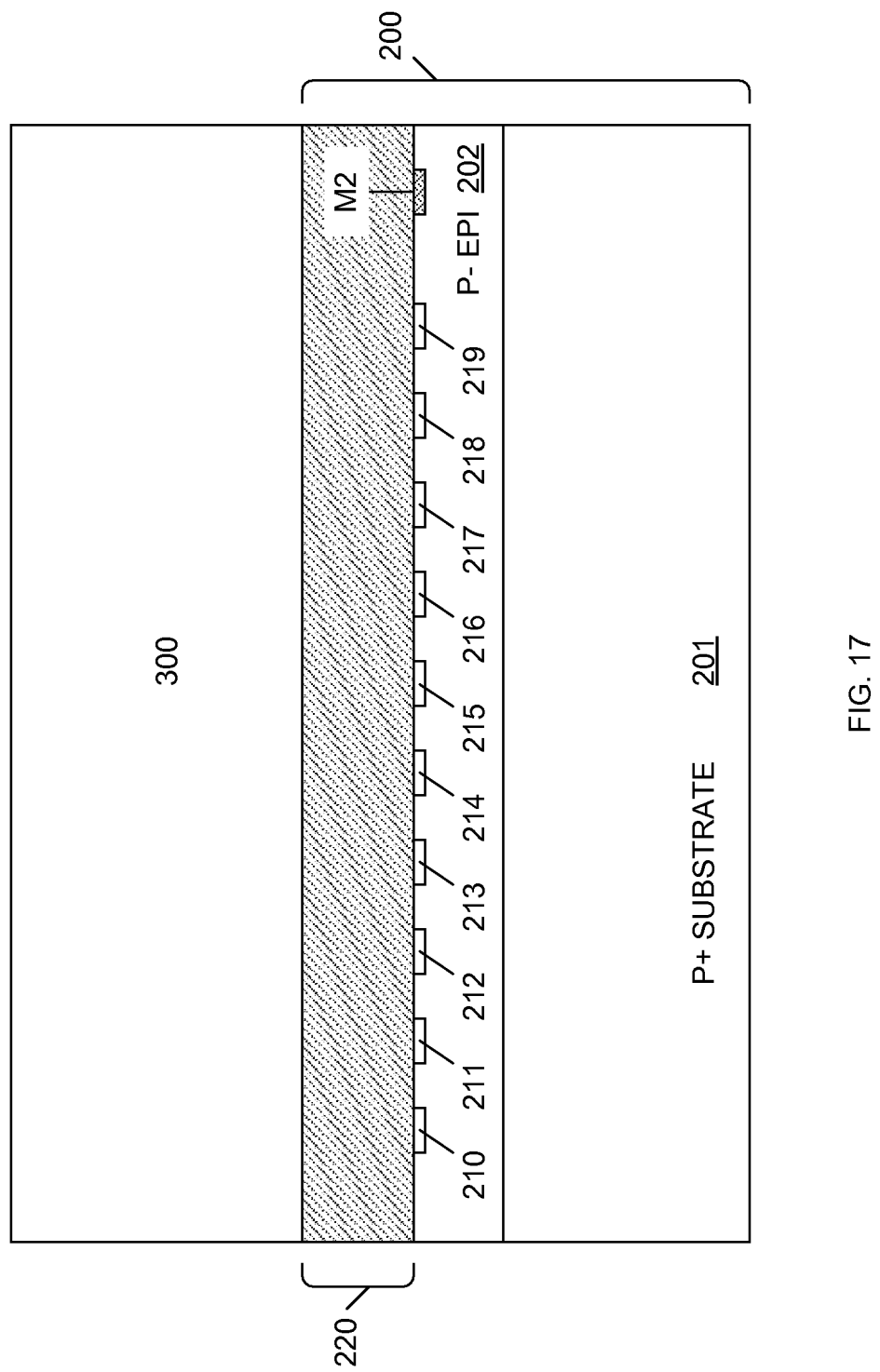
FIGS. 17-20 are cross sectional views that illustrate process steps for converting the CMOS image sensor of FIG. 11 into an X-ray image sensor using a double bonding technique in accordance with an alternate embodiment of the present invention.

As illustrated in FIG. 17, a silicon wafer 300 is bonded to the front side of CMOS image sensor 200 using, for example, an adhesive. The thickness of top silicon wafer 300 is identical to the thickness of standard silicon wafers used in CIS manufacturing.

Figure 18:
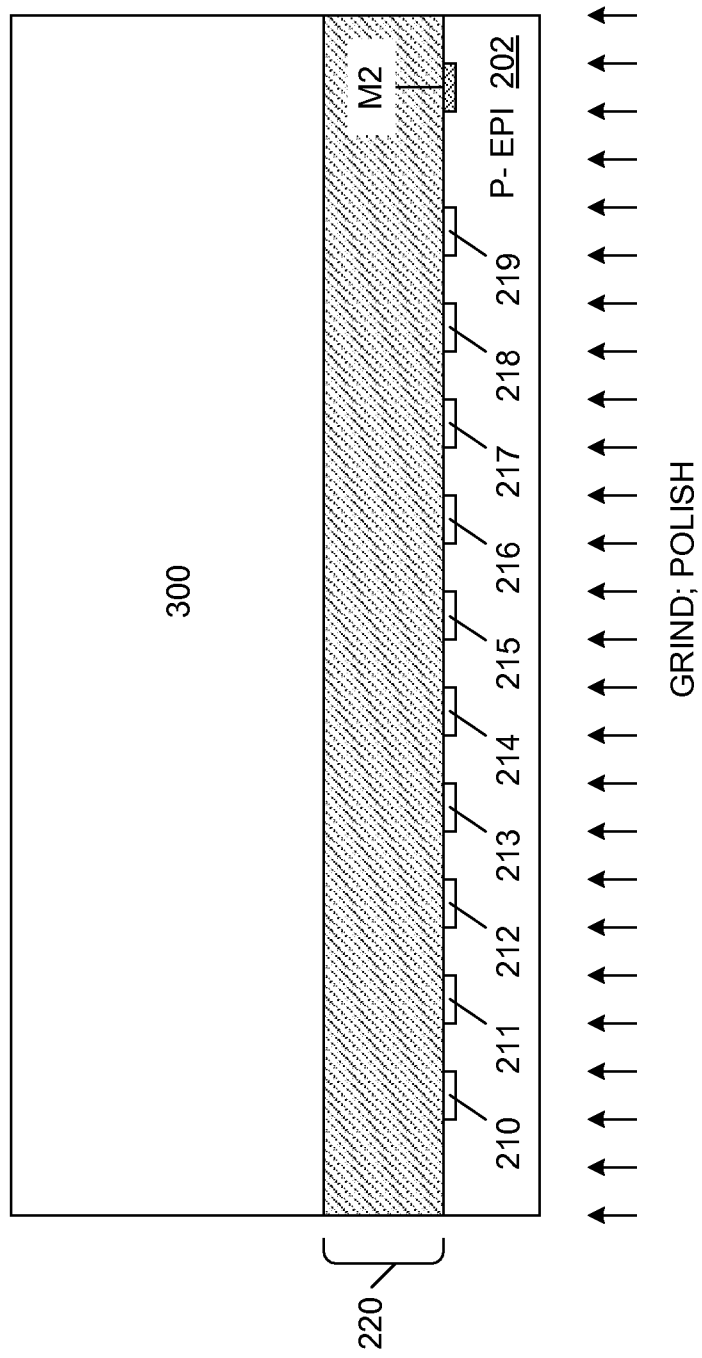

The back side (i.e., P+ substrate 201) is then grinded and polished down to P− epitaxial layer 202, as illustrated in FIG. 18.

Figure 19:
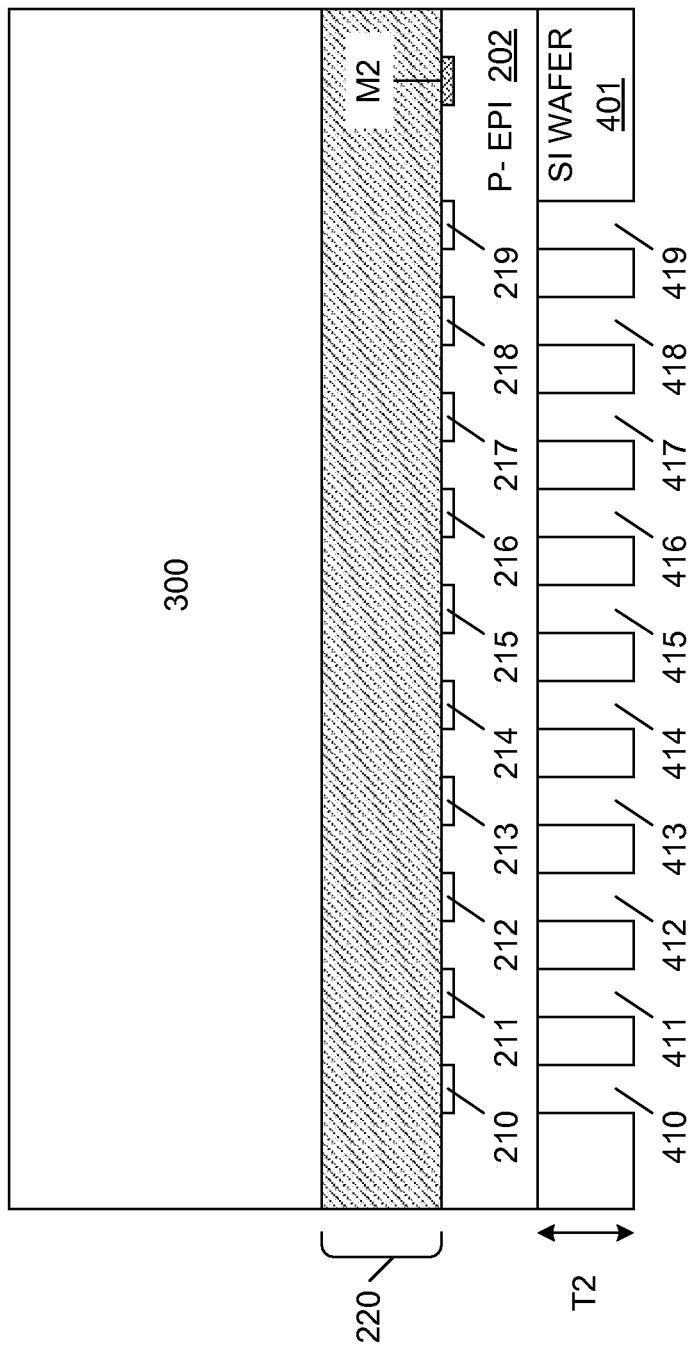
Figure 20:
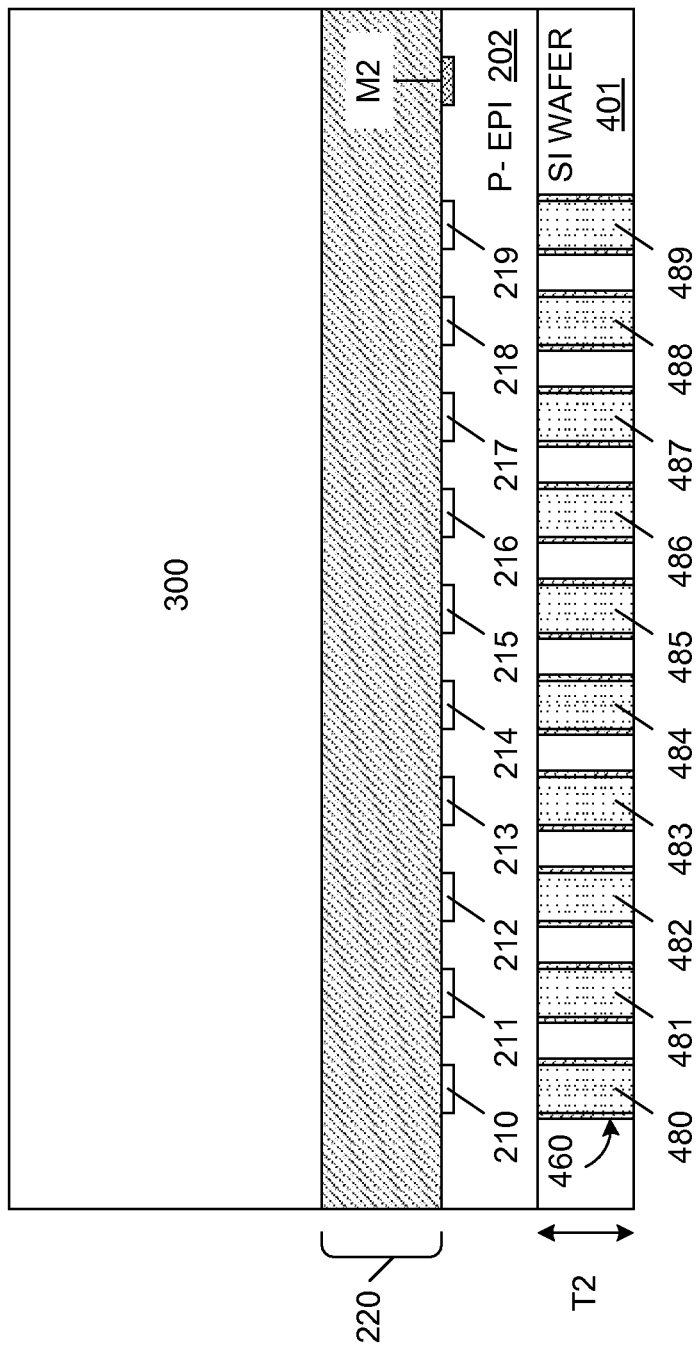

As illustrated in FIG. 19, a via-processed silicon wafer 401 is bonded to the polished surface of P− epitaxial layer 202. In one embodiment, this bonding step is implemented using an adhesive. Prior to bonding, a plurality of via holes, including via holes 411-491, are formed through wafer 401. The via holes are positioned and dimensioned to correspond with the locations and sizes of the photodiodes in CMOS image sensor 200. The thickness T2 of via-processed wafer 401 is selected to correspond with the desired scintillating material thickness. In one embodiment, via-processed wafer 401 has a thickness T2 of approximately 150 microns.

Via-processed wafer 401 may be formed by grinding a silicon wafer to the desired thickness (T2), performing a via etch through the grinded wafer, and then bonding the resulting wafer structure to P− epitaxial layer 202. Alternately, via-processed wafer 401 may be formed by performing a via etch through the full thickness of a silicon wafer, bonding the etched silicon wafer to P− epitaxial layer 202, and then grinding the etched silicon wafer to the desired thickness (T2).

The portions of p− epitaxial layer 202 exposed through via holes 410-419 are treated in a manner similar to that described above in connection with FIG. 14. After via holes 410-419 have been treated, processing proceeds in the same manner described above in connection with FIGS. 5-10, thereby creating the X-ray image sensor illustrated in FIG. 20. The X-ray image sensor of FIG. 20 includes reflective layer 460, scintillating plugs 480-489, and reflective layer 490 (which are similar to the above-described reflective layer 160, scintillating plugs and reflective layer 190, respectively).

Although the invention has been described in connection with several embodiments, it is understood that this invention is not limited to the embodiments disclosed, but is capable of various modifications, which would be apparent to a person skilled in the art. Thus, the invention is limited only by the following claims.

We claim:

1. A method of fabricating an integrated X-ray image sensor comprising: reducing a thickness of a semiconductor image sensor by removing material from a back side of the semiconductor image sensor; then forming a plurality of openings in the back side of the semiconductor image sensor; then forming a layer of scintillating material over the back side of the semiconductor image sensor; and then applying a force to the layer of scintillating material, such that at least part of the layer of scintillating material is forced into the plurality of openings, forming a plurality of pixels and one or more alignment marks on a front side of the semiconductor image sensor, opposite the back side of the semiconductor image sensor; and aligning the openings in the back side of the semiconductor image sensor with the plurality of pixels on the front side of the semiconductor image sensor using the one or more alignment marks.

2. The method of claim 1, wherein the step of reducing the thickness of the semiconductor image sensor comprises grinding the back side of a semiconductor wafer.

3. The method of claim 2, wherein the step of reducing the thickness of the semiconductor image sensor is stopped when the back side of the semiconductor wafer has a thickness in the range of 50 to 250 microns.

4. The method of claim 1, wherein the step of forming a plurality of openings in the back side of the semiconductor image sensor comprises performing a deep reactive ion etch.

5. The method of claim 4, further comprising stopping the deep reactive ion etch on a buried insulating layer in the semiconductor image sensor.

6. The method of claim 4, further comprises performing a wet etch after the deep reactive ion etch has been stopped, and stopping the wet etch on an epitaxial silicon layer in the semiconductor image sensor.

7. The method of claim 6, further comprising thermally oxidizing portions of the epitaxial silicon layer exposed by the wet etch.

8. The method of claim 6, further comprising implanting an impurity into portions of the epitaxial silicon layer exposed by the wet etch.

9. The method of claim 1, further comprising forming a layer of reflective material on sidewalls of the openings prior to forming the layer of scintillating material.

10. The method of claim 9, further comprising forming the layer of reflective material by forming silicon oxide on the sidewalls of the openings.

11. The method of claim 9, further comprising forming the layer of reflective material by forming a metal on the sidewalls of the openings.

12. The method of claim 1, wherein the steps of forming the layer of scintillating material and applying a force to the layer of scintillating material are performed at temperatures that do not exceed 500° C.

13. The method of claim 1, wherein the step of applying a force to the scintillating material comprises introducing a pressure of at least about 10 MPa to the layer of scintillating material.

14. The method of claim 1, wherein the step of applying a force to the scintillating material comprises mechanically pressing the layer of scintillating material.

15. The method of claim 1, further comprising depositing a layer of optically reflective material over the back side of the semiconductor image sensor after scintillating material has been forced into the openings.

16. The method of claim 1, wherein the step of forming the openings is performed such that the openings have a conical shape.

* * * * *